(12) United States Patent
Habuka et al.

(10) Patent No.: US 8,588,546 B2
(45) Date of Patent: Nov. 19, 2013

(54) APPARATUS AND PROGRAM FOR PRODUCING A PANORAMIC IMAGE

(75) Inventors: Kensuke Habuka, Tokyo (JP); Masaki Hiraga, Tokyo (JP)

(73) Assignee: Morpho, Inc., Tokyo (JP)

( * ) Notice: Subject to any disclaimer, the term of this patent is extended or adjusted under 35 U.S.C. 154(b) by 1015 days.

(21) Appl. No.: 12/220,300

(22) Filed: Jul. 23, 2008

(65) Prior Publication Data

US 2009/0028462 A1 Jan. 29, 2009

(30) Foreign Application Priority Data

Jul. 26, 2007 (JP) ................................. 2007-194343

(51) Int. Cl.
*G06K 9/36* (2006.01)
*G06K 9/32* (2006.01)

(52) U.S. Cl.
USPC .............................. 382/284; 382/294; 348/36

(58) Field of Classification Search
USPC .............. 382/284, 294; 348/36, 588; 345/588
See application file for complete search history.

(56) References Cited

U.S. PATENT DOCUMENTS

| | | | |
|---|---|---|---|
| 5,956,026 A * | 9/1999 | Ratakonda .................... | 715/723 |
| 5,987,164 A * | 11/1999 | Szeliski et al. ................ | 382/154 |
| 6,075,905 A | 6/2000 | Herman et al. | |
| 6,078,701 A * | 6/2000 | Hsu et al. ...................... | 382/294 |
| 6,532,036 B1 | 3/2003 | Peleg et al. | |
| 6,535,650 B1 * | 3/2003 | Poulo et al. ................... | 382/284 |
| 7,120,195 B2 * | 10/2006 | Patti et al. ................ | 375/240.03 |
| 7,239,805 B2 * | 7/2007 | Uyttendaele et al. ......... | 396/222 |
| 7,847,823 B2 * | 12/2010 | Habuka et al. ............. | 348/208.4 |
| 2006/0187234 A1 * | 8/2006 | Deng et al. .................... | 345/592 |

FOREIGN PATENT DOCUMENTS

| | | | | |
|---|---|---|---|---|
| EP | 0884897 A1 | 12/1998 | | |
| EP | 1530360 A2 | 5/2005 | | |
| GB | EP0884897 A1 * | 12/1998 | ............ | H04N 5/232 |
| JP | 07-220025 | 8/1995 | | |
| JP | 08-154167 | 6/1996 | | |
| JP | 09-097326 | 4/1997 | | |
| JP | 09-261520 | 10/1997 | | |
| JP | 10-126665 | 5/1998 | | |
| JP | 11-112790 | 4/1999 | | |
| JP | 2000-322563 | 11/2000 | | |
| JP | 2004-247793 | 9/2004 | | |
| JP | 2005-151563 | 6/2005 | | |
| JP | 2005-252803 | 9/2005 | | |
| WO | WO2006/075394 | * | 7/2006 | ................ G06T 7/20 |

\* cited by examiner

*Primary Examiner* — Matthew Bella
*Assistant Examiner* — Julian Brooks
(74) *Attorney, Agent, or Firm* — Muramatsu & Associates

(57) ABSTRACT

A panoramic image producing apparatus provides an intensity image production unit which produces intensity images from an input source image captured by an imaging device, a reference image data storage unit for storing a reference image which is used to compute the motion data of the intensity image and its absolute motion data, an absolute motion data calculation unit which uses the intensity image of the target image by first computing its relative motion data with respect to the reference image and using its result to compute the absolute motion data with respect to the target image, an image stitching unit to produce a panoramic image by using the absolute motion data computed above to stitch together the input source images, and a reference image setting unit which sets the target image as the new reference image under certain conditions.

6 Claims, 5 Drawing Sheets

EXAMPLE OF SNAPSHOT

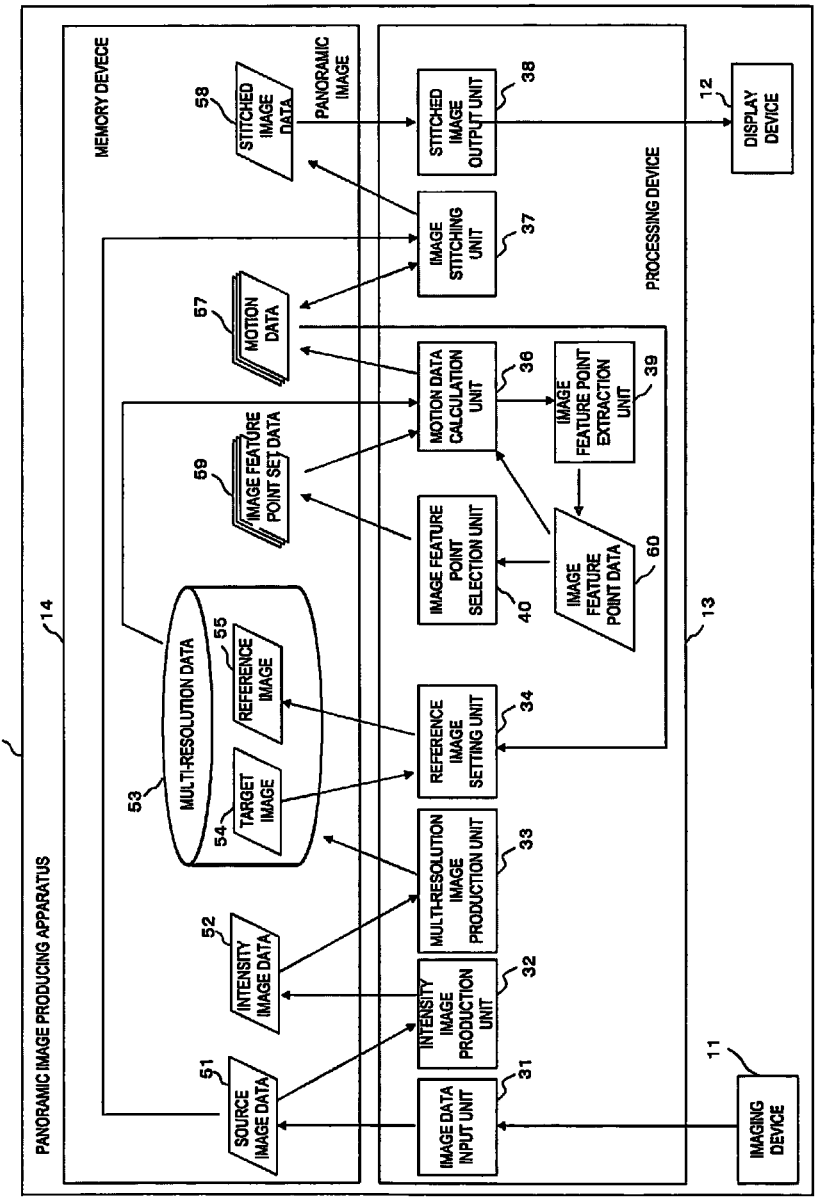

FEATURE POINT MATCHING
AMONG INTENSITY IMAGES

STITCHING PROCESS
WITH HIGH RESOLUTION IMAGES

APPARATUS AND PROGRAM FOR PRODUCING A PANORAMIC IMAGE This application claims the benefits of foreign filing priority based on Japanese Patent Application No. 2007-194343 filed Jul. 26, 2007, the entire contents of which are incorporated herein by reference.

BACKGROUND OF THE INVENTION

1. Field of the Invention

The present invention relates to a device and program for producing a panoramic image by stitching multiple images together.

2. Description of the Related Art

Recent years have seen proposals for technologies that use computer processing to build an image-based wide-angle panoramic image by using multiple images of different angles captured by devices such as digital cameras.

Japanese Application Laid-Open Publication No. 2005-151563, for example, discloses such a method that lowers the resolution of high resolution images captured by a camera set to panoramic mode to create video frames. The motion between reference video frame and input video frame is estimated, and if the estimated value of the motion is greater than a specified predetermined value, a new high resolution image is captured and its video frame becomes the new reference video frame. Estimated motion data of the reference video frame is used as the initial value to compute the relative position of the high resolution image, then the high resolution images are stitched together to produce a mosaic panel (i.e. a panoramic image).

Japanese Application Laid-Open Publication No. 2004-247793 discloses such a method that produces a panoramic image by continually offsetting the subject area while tracking local feature points of the continuously shot images.

A challenge for existing methods that stitch newly captured high resolution images into the existing panoramic image (panoramic canvas) has been to produce a natural looking panoramic image in real time while compensating for the distortions between the images caused by changes in distance to the subject, angle, etc.

If camera is panned or tilted only in a single direction, horizontal or vertical, then the methods disclosed in the patent application documents above are sufficient for stitching images together by tracking successive local image feature points and compensating for the new images. However, when producing a 2-dimensional panoramic image by moving the camera both horizontally and vertically, or in a diagonal direction, or by changing the panning or tilting direction, new need arises to stitch the input image together with an image that has been captured more than one frame before the current input image. In this case, it is required to avoid producing a panoramic image with unnatural junctions caused by error accumulation.

The problem with existing panoramic image production methods that track image feature points is its requirement to perform highly accurate coordinate matching with the tracked image feature points that were previously detected.

Panoramic image production method stated above applies to single direction panning, therefore the reference frame and image feature points of the immediately previous frame is used, and older data can be discarded, thus reducing the memory requirement. On the other hand, when producing a 2-dimensional panoramic image, the problem of how to reduce the memory and processing power requirements while storing data that are older than from the immediately previous frame becomes important.

SUMMARY OF THE INVENTION

In view of the foregoing points, an object of this invention is to provide an apparatus and a program for producing a panoramic image that can produce a natural looking panoramic image from images captured via 2-dimensional camera movement while reducing the processing power and memory space requirements.

In order to achieve the object, there is provided according to an aspect of the present invention, a panoramic image producing apparatus including an intensity image production unit which produces intensity images from input source image captured by an imaging device, a reference image data storage unit for storing a reference image which is used to compute the motion data of the intensity image and its absolute motion data, an absolute motion data calculation unit which uses the intensity image of the target image (newly captured input source image) by first computing its relative motion data against the reference image and using its result to compute the absolute motion data against the target image, an image stitching unit to produce a panoramic image by using the absolute motion data computed above to stitch together input source images, and a reference image setting unit which sets target image as the new reference image under certain conditions.

The panoramic image producing apparatus of this invention generates intensity image from high resolution input source image, then compares the intensity image (target image) to the reference image to compute the motion data necessary to produce high definition panoramic images. The motion data calculation unit first computes the motion data of the target image relative to its reference image, and then uses the motion data (absolute motion data) derived from the reference position data stored with the reference image to compute the absolute motion data of the target image. A panoramic image is continuously expanded by stitching the input source image hereto by using the computed absolute motion data of the target image. When specific conditions described below are met, target image is set as the new reference image, which is then stored along with its absolute motion data.

The conditions for setting a target image as the new reference image can be, for example, every new target image captured by the imaging device is set as the new reference image, or replace the reference image with a target image only when the positional displacement between a target image and the reference image is greater than a specified predetermined value. The latter method has the advantage of being less likely to accumulate computational error when compared to the former method.

If the absolute motion data can be computed using the reference position, then the scope of this invention will cover not only the absolute motion data being stored along with each reference image, but also the relative motion data between consecutive input source images stored, and using the history of relative motion data to compute the absolute motion data from the reference position. The scope of the intensity image includes an image that is bi-directionally convertible therebetween, such as the brightness image.

According to another aspect of the present invention, the panoramic image producing apparatus includes an intensity image registration unit for registering the intensity image of the target image and its motion data if the displacement value between previously registered intensity image and the target image is above a certain predetermined value, and the motion data calculation unit extracts one or more intensity images out of intensity images that are registered by the intensity image registration unit depending on the amount of overlap with the target image in the perpendicular direction against the motion direction of the target image, and calculates the relative motion data of the target image using the reference image and the intensity images extracted.

The panoramic image producing apparatus of this invention stores the very first intensity image produced, and any subsequent intensity image and its motion data with positional displacement exceeding specific predetermined value when compared to the reference image, and this information is used to compute motion data along with the reference image. This method allows more precise stitching of images, and saves memory space by not requiring storage of all intensity images that were produced.

According to still another aspect of the present invention, the panoramic image producing apparatus provides a feature point set detection unit for detecting feature points in intensity images, and means for storing, as the feature point data, the feature amount and the positional data of the feature points detected by the feature point set detection unit, and the motion data calculation unit calculates the relative motion data of the target image based on the feature point data of the target image and the stored feature point data.

This invention matches image feature points of intensity images of input source image and reference image to determine the motion data that is used to compute the motion direction and value of positional displacement. The reference image intensity image may be replaced by the input source image intensity image if the motion data computation based on image feature points is greater than the specified predetermined value. Required memory is reduced by only storing image feature points to calculate motion data and produce panoramic images instead of also storing intensity images. Accuracy of panoramic image production is improved by the use of the stored image feature point set which is used to match against the image feature points of the target image, if there is at least one match then motion data is calculated. This is an improvement on only using the intensity image of the target image and the intensity image of the reference image to compute the motion data as it allows for more accurate distortion correction.

The scope of the image feature points includes not only individual image feature points but also image feature points and its surrounding pixels treated as a block.

Preferably, the image stitching unit divides input images to be stitched into blocks or pixels, and changes the blending ratio depending on the block or pixel location inside the input image and/or its absolute motion data.

This invention produces higher quality panoramic images using blending ratios that are adjusted using methods such as weighed-averages that weigh sharp parts of the image more heavily than distorted parts, caused by blurring or lens distortion. Accurate image stitching is achieved by weighing the blending heavily each time the positional displacement between the images is greater than the specified predetermined value, lighter weighing is used for lesser positional displacements.

In order to achieve the object, there is provided according to another aspect of the present invention, a non-transitory computer readable medium containing a computer program for producing a panoramic image from input images captured by an imaging device including the following steps:
(a) creating intensity images of the input images,
(b) producing an intensity image of an input image captured by an imaging device,
(c) storing a reference image which is used as the reference when the motion of the intensity image is calculated and the absolute motion data of the reference image which represents motion of the reference image from the reference position,
(d) setting the intensity image of the new input image as the target image, calculating the relative motion data of the target image against the reference image, and calculating the absolute motion data of the target image from the reference position using the absolute motion data of the reference image and the relative motion data of the target image,
(e) producing a panoramic image by stitching each input image using its absolute motion data calculated by step (d), and
(f) setting the target image as the new reference image based on a specific condition.

According to the present invention, 2-dimensional panoramic images that are natural in appearance can be produced while requiring less memory usage and less computer processing power because motion data is computed using the snapshot images which consist of intensity images. High quality image stitching is achieved with the use of image feature points and motion data of its surrounding area, which are used in addition to the image feature points of the previous reference image.

Additionally, higher quality panoramic images are produced by setting a threshold value for image distortions such as blurring which lower the quality of stitched images, and if certain images or image blocks are above this threshold then their weight is lessened when blending the images or image blocks into the panoramic canvas.

BRIEF DESCRIPTION OF THE DRAWINGS

FIG. 4 is a block diagram of a panoramic image producing apparatus according to the second embodiment of this invention.

DESCRIPTION OF THE PREFERRED EMBODIMENTS

Figure 1:
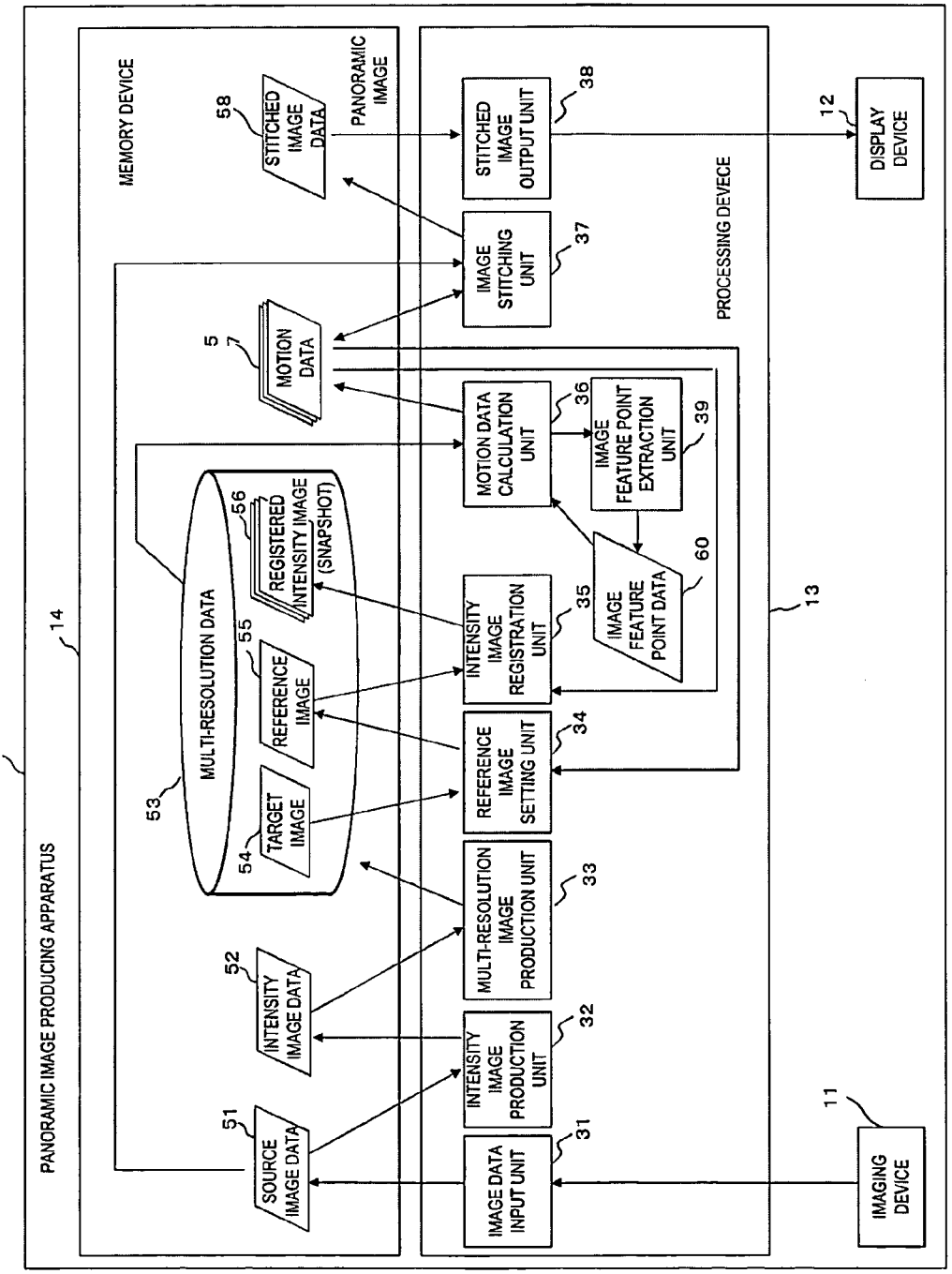
FIG. 1 is a block diagram of a panoramic image producing apparatus according to a first embodiment of this invention.

Preferred embodiments in accordance with this invention will be described below. FIG. 1 is a functional block diagram of the first embodiment of the panoramic image producing apparatus.

The panoramic image producing apparatus 1 includes imaging device 11 to capture photographic images, the processing device 13 to produce a panoramic image by performing computations of values such as motion vectors and affine parameters of the input source images, display device 12 to display the panoramic image, and memory device 14 to store data such as source image data, computed motion data, and the panoramic image.

The processing device 13 includes image data input unit 31 which stores image data captured by imaging device 11 into memory device 14, intensity image production unit 32 which produces intensity images from each input source image data, the intensity images will be used to calculate motion data in a later step, multi-resolution image production unit 33 which uses filtering technology to produce image data of various resolutions, image feature point extraction unit 39 which extracts image feature points, motion data calculation unit 36 which uses multi-resolution images of the intensity image and image feature points to calculate motion data, reference image setting unit 34 which can replace the reference image with the newly produced intensity image (target image) used to calculate motion data, intensity image registration unit 35 which registers the reference image and its motion data as the snapshot if the positional displacement with the reference image and past registered intensity images is greater than the specified predetermined value, image stitching unit 37 which produces the panoramic image by stitching input source images together according to motion data, and stitched image output unit 38 which outputs the panoramic image. Units 31 to 39 are processing units and can be realized by computer programs. Each unit need not be implemented separately, as some of the functionalities can be combined.

Each storage unit in memory device 14 will be described here. The data stored in source image data storage 51 has information on width w, height h, and a lattice with w*h elements where each element stores pixel data (such as RGB or YCbCr).

Intensity image data stored in the intensity image data storage 52 has pixel data with intensity component. Also, its lattice elements are pixel skipped or averaged where necessary which reduces the input source image data size.

Multi-resolution data stored in multi-resolution data storage 53 has images with multiple levels of resolutions produced using a filtering process.

Motion data stored in motion data storage 57 are usually affine parameters or motion vectors. Motion vectors can be motion vector mesh data consisting of multiple motion vector points, motion vector lines, and motion vector domains.

Stitched image data stored in stitched image data storage 58 contains the same resolution ratio and pixel information as source image data stored in storage 51. The stitched image data is produced by matching the pixels (including image feature points) using motion data stored in storage 55.

Method of calculating motion data in the panoramic image producing apparatus 1 above will be described here.
(Image Data Input Process)

Image data captured by imaging device 11 is stored in source image data storage 51 by the image data input unit 31. The input source image data has width w, height h, and w*h lattice elements, where each element contains a pixel value (such as RGB, and YCbCr.)
(Intensity Image Production Process)

Intensity image is produced next by using intensity image production unit 32, where source image data stored in source image data storage 51 is pixel skipped, skipped pixels are averaged to reduce image size, and this reduced image is used to produce the intensity image data which will be used to detect motion data. Depending on the size of the source image, intensity image may be produced without image size reduction. The newly produced intensity image is stored in intensity image data storage 52.

(Multi-Resolution Image Production Process)

Above intensity image is filtered by multi-resolution image production unit 33 which outputs lower resolution images which are stored in multi-resolution image data storage 53.

If necessary, the multi-resolution image production unit 33 performs extraction of image edges on the intensity image data to create the resolution level 0 (highest resolution) image, whereupon a blur filter and an averaging filter are used on the resolution level 0 image to produce lower resolution images, and thus produced multi-resolution image data are stored in the multi-resolution data storage 53. Multi-resolution image data can also be produced by reducing the size of the image at a certain ratio to lower the resolution instead of using filters.
(Image Feature Point Extraction Process)

Image feature point extraction unit 39 extracts image feature points by detecting the intensity of edges and corners in the intensity image. If an image feature point is detected at a certain coordinate, it is better not to detect another image feature point nearby. This is because motion data of nearby image feature points are predicated to have almost identical values, and it is better to evenly distribute image feature points throughout the image. Image feature point extraction process is performed on images of certain resolutions, in the multi-resolution image, to which block matching processing is applied. And these extracted image feature points can be discarded following the motion data computation described hereafter.
(Motion Data Calculation Process)

Motion data calculation unit 36 provides computation of the motion data with the procedure described below using the reference image and the target image and one or more of the registered intensity image data. Target image is the intensity image of the image newly captured using imaging device 11, and reference image is the intensity image used to calculate the motion data of the target image. The very first intensity image is initially set as the reference image, and then the reference image is replaced by the target image if the positional displacement with respect to the existing reference image is greater than a predetermined specified value.

The motion detection methodology provided to determine the motion between the reference image and the target image is described here.
<Step S1>
Determine parallel movement $(d_x, d_y)$ between the reference image and the target image by using the lowest resolution intensity images of both images to perform a whole-image matching process or a block matching process on the intensity images.

Computing resources will not be strained even for whole-image matching if lowest resolution images are only x*y pixels where x and y are both tens of pixels long. For panoramic images, parallel motion will be most prominent, so only the value of parallel movement $(d_x, d_y)$ needs to be determined.

Whole-image matching process will be described here.
First, use the following equation to compute local contrasts in the local contrast image production process.

[Equation 1]

$$I'(x, y) = I(x, y) - \sum_{\substack{x-s \leq p \leq x+s \\ y-s \leq q \leq y+s}} I(p, q)/(2s+1)^2, \quad (1)$$

where I(x, y) denotes the brightness at input image coordinates (x, y), I'(x, y) denotes the brightness at output local contrast image coordinates (x, y), s is a constant denoting the size of the local area. Above equation determines the relative local contrast value between a certain pixel and the average brightness value of its surrounding pixels. The use of this method compensates for changes in brightness caused by the panoramic shooting motion, and darkness around the image frame caused by lower quality lenses.

Next, compute the movement $(d_x, d_y)$ between image $I_1$ and image $I_2$ using the optimal displacement computational process. The motion energy $E(d_x, d_y)$ of the movement $(d_x, d_y)$ from $I_1$ to $I_2$ is defined as follows.

[Equation 2]

$$E(d_x, d_y) = \frac{\sum_{x}^{y} |I_1(x+d_x, y+d_y) - I_2(x, y)|}{(W - |d_x|)(H - |d_y|)}, \quad (2)$$

where W denotes image width, and H denotes image height. $E(d_x, d_y)$ is the averaged absolute difference of values contained in shared pixels of $I_1$ and $I_2$ after the $(d_x, d_y)$ positional displacement. $E(d_x, d_y)$ can be the averaged sum of the square of the pixel value difference.

Smaller the $E(d_x, d_y)$ means that the images are more similar, therefore determine the $(d_x, d_y)$ that outputs the smallest $E(d_x, d_y)$ value.

Above method is used to compute the motion data of the movement $(d_x, d_y)$ from image $I_1$ to image $I_2$.

<Step S2 (Compensating Process for Motion Data Calculation Using Registered Intensity Images)>

Figure 3A:
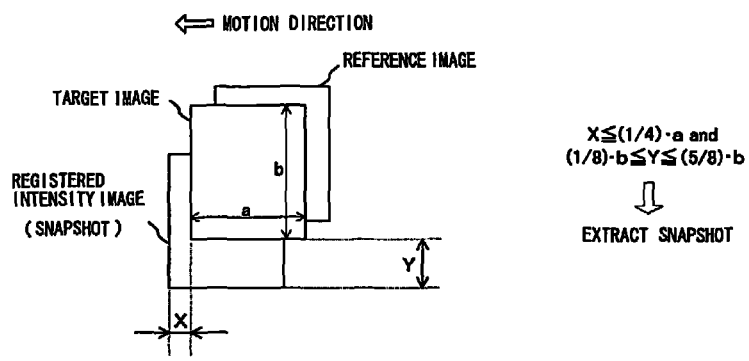
FIG. 3A is an explanatory diagram of extraction condition under which the motion data calculation unit 36 selects registered intensity image(s)

Following Step S1 in which the approximate motion data for the displacement between the reference image and target image is calculated, one or more registered intensity image(s) that overlap with the target image are selected from the multi-resolution data storage 53. In order to efficiently select registered intensity images, determine the direction of the movement from the motion data computed using the reference image and target image, then select registered intensity images that may have vertical positional displacement against the motion but with large overlap of the motion direction. For example, FIG. 3(A) shows input source image moving in direction x, then select a registered intensity image where y is ⅛ to ⅝ of image height ("b" in the diagram) and x is less than ¼ of image width ("a").

If multiple registered intensity images are selected, they could all be used in the computation, but it is also valid to just use a subset of those intensity images, such as the oldest image or the image with the furthest positional displacement.

Use the absolute motion data of the registered intensity images in order to compute the relative motion data of the target image against the reference image. This relative motion data will be used in a later step. Step S2 is only necessary when producing panoramic images that extend in 2-dimensional directions.

<Step S3>

Next, use the motion data computed above as the initial value to perform block matching with the image feature points extracted by the image feature points extraction method. Block matching process can be performed using techniques disclosed as such in WO 2006/075394. Compute motion data using the lowest resolution intensity image first, and then compute the motion data of the next lowest resolution intensity image, and so on with the multi-resolution images produced from the input source image. When computing the motion data of the next level of resolution, use the motion data computed using the previous (lower) level of resolution as the initial value.

Find the affine parameters by performing weighed least squares on the motion data of each block (image feature point) computed earlier via block matching.

Then, accuracy of the motion data is improved by using motion data with multi-degrees of freedom from the previous (lower) level of resolution as the initial value in the computations. In the case of the lowest resolution intensity image, the motion data has two degrees of freedom.

The equation for this case is as follows.

[Equation 3]

$$v_{i+1}(x_1, y_1) = (X_{i+1}^{-1} V_{i+1})^T \binom{x_1}{y_1} - \binom{x_1}{y_1} \quad (3)$$

Where:

[Equation 4]

$$X_{i+1}(x_1, y_1) = \sum_{(x_2, y_2) \in (x_1, y_1) \text{の周囲}} a_i(x_1, y_1, x_2, y_2) r_i(x_2, y_2) \begin{pmatrix} x_2 x_2 & x_2 y_2 & x_2 \\ x_2 y_2 & y_2 y_2 & y_2 \\ x_2 & y_2 & 1 \end{pmatrix} \quad (4)$$

[Equation 5]

$$V_{i+1}(x_1, y_1) = \sum_{(x_2, y_2) \in (x_1, y_1) \text{の周囲}} a_i(x_1, y_1, x_2, y_2) r_i(x_2, y_2) \begin{pmatrix} u_2 x_2 & v_2 x_2 \\ u_2 y_2 & v_2 y_2 \\ u_2 & v_2 \end{pmatrix} \quad (5)$$

[Equation 6]

$$(u_2, v_2) = (x_2, y_2) + v_i(x_2, y_2) \quad (6)$$

The affine parameters obtained in the computation above are used as the initial value for computing the motion data of the next (higher) level of resolution.

If one or more registered intensity images are selected in step S2, extract the image feature points of the selected registered images that share image feature points with the target image based on the relative motion data of the registered intensity image from the reference image. Then, perform a block matching algorithm on the extracted image feature points, and obtain the affine parameters of the image blocks by performing weighed least squares using the motion data of the image blocks. The correction factor of image distortion caused by reversing the panning direction during the panoramic shoot will be affected by weight ri on registered intensity image feature points and weight ri on reference image feature points. From experience, it is better to make the weight of the registered image feature points slightly heavier than the weight for the reference image feature points.

<Step S4>

Next, determine whether final resolution level (normally resolution level 0) has been reached. If it is not yet the final resolution level, then L=L−1 which raises the resolution level by one, and then repeat step S3 with this new resolution level. If the final resolution level has been reached, this means that the motion data computation is being performed for the input source intensity image; convert the motion data so that it is compatible with the original highest resolution image, then store the converted motion data in motion data storage device 57.

Motion data computed above is relative motion data, as it is the motion data of the target image against the reference image. In panoramic image production, greater accuracy is achieved by storing the original reference position (such as the first reference image), and always computing the motion data against that original reference position, this reduces error accumulation for the image stitching process described below.

(Image Stitching Process)

Produce panoramic image (panoramic canvas) by stitching together input source images using the absolute motion data computed above. Once the new panoramic image including the new input source image is produced, discard the input source image.

Image stitching can be performed using weighted averages on target pixels or blocks after using cylindrical mapping to correct for distortions. The weight is determined by the distance of the pixel or block from the center of the input source image. The weight of the input source image itself can be periodically altered according to a motion. If the camera image stabilization feature is activated, then the amount of image stabilization can also affect image weight. Image stabilization methods can vary, such as using gyroscopic sensors, matching a focus function or a point spread function against a predetermined value, or using pure software applications.

(Reference Image Setting Process)

Reference image setting unit 34 initially sets the intensity image of the first input source image as the initial reference image, then the next input source image is treated as target image and its motion data is computed using motion data calculation unit 36. The initial image position is stored as the reference position for converting relative motion data of future input source images into absolute motion data (i.e. the motion data from the reference position )to perform panoramic image stitching.

Reference image setting unit 34 can set the previous target image as the current reference image each time, or the reference image can be replaced when image positional displacement is greater than a specified predetermined value.

(Intensity Image Registration Process)

Intensity image registration unit 35 stores the first reference image created in the above procedure as registered intensity image 56. Then, each time the image positional displacement of the reference image with respect to the registered intensity image is greater than the specified predetermined value, the reference image and its absolute motion data are added as registered intensity image data. Absolute motion data is motion data computed against the initial reference position, this is usually computing the motion data against the first registered reference image.

Figure 2:
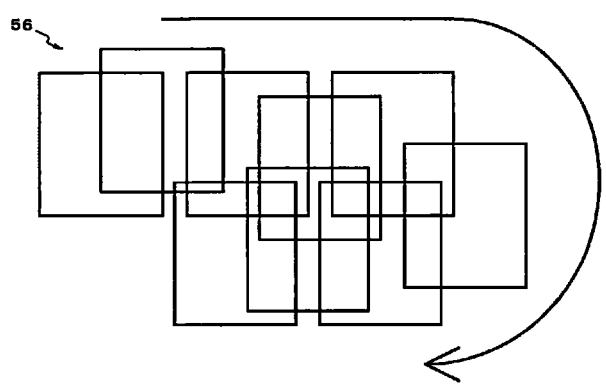
FIG. 2 is an explanatory diagram of positional relation of snapshots that are stored in the intensity image storage 52 of FIG. 1.

FIG. 2 shows registered intensity images as being multiple images that overlap with each other. This group of registered intensity images will be referred to as the snapshot. The snapshot also stores the absolute motion data information along with the intensity images. The stored absolute motion data should be the one computed in step S4 using the high resolution input source image which has multi-degrees of freedom; it should not be the motion data computed using a reduced size intensity image.

Figure 3B:
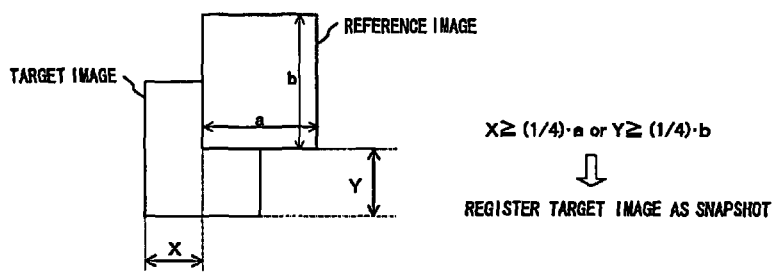
FIG. 3B is an explanatory diagram of positional displacement by which the intensity image registration unit 35 determines whether to register the target image as the snapshot.

If the positional displacement of the target image is greater than the specified predetermined value for every registered intensity image, then add the intensity image of the target image to the snapshot. The amount of displacement required to add the intensity image of the target image to the snapshot should be approximately ¼ of the image size, this is shown in variables a and b in FIG. 3 which are the x and y values.

By following these steps, the panoramic image gets produced using input source images captured by imaging device 11, stitching them to the existing panoramic canvas, and then discarding the input source image after the stitching process. The intensity image of the target image gets added to the snapshot only when the positional displacement value is greater than the specified predetermined value.

According to this preferred embodiment, only intensity images that satisfy the specific predetermined conditions are stored and added as new registered intensity images (i.e. snapshots), instead of storing every intensity image created from the high resolution input source image. Following the detection of the motion of the target image against the reference image; the target image is the intensity image of the newly captured input source image, one or more registered intensity image(s) that overlap with the target image are selected from the snapshots using the motion data of the target image against the reference image. Then the motion data is calculated between the target image and each of the selected registered image(s). Stitching the input source image to the panoramic canvas using these various motion data produces high quality panoramic images.

Accurate stitching is made possible by the algorithm described above wherein the lowest resolution intensity image is used to compute the motion data with two degrees of freedom according to the whole-image matching process on a certain range of the image, and higher resolution intensity images use the motion data value of the lower resolution intensity image to compute its motion data with multi-degrees of freedom, this increases the accuracy of the matching while reducing computing requirements when producing panoramic images in real time.

A second embodiment is described here. This embodiment stores image feature points of intensity images instead of the snapshot. Stitching of the input source image is made possible by computing the motion data of the image feature points and its surrounding blocks.

FIG. 4 is the block diagram of the panoramic image producing apparatus 1 of the second embodiment. The difference from FIG. 1 is the removal of intensity image registration unit 35 and registered intensity image storage device 56, and the addition of image feature point selection unit 40 which determines whether to store the image characteristic extracted using image feature point extraction unit 39, image feature point set data 59, which stores the image characteristic selected in image characteristic selection unit 40, has also been added to the diagram. Other than the differences stated above, the block diagram is identical to that of FIG 1., therefore the same parts of the diagram are assigned the same number to avoid repeat descriptions. Image feature point selection unit 40 is a processing unit and can be realized by a computer program.

Image feature points data set is a collection of image feature points data which consists of such information as image characteristic coordinate (x,y) and the intensity of the feature points. It is preferred that only the image feature points and information of their surrounding pixels are stored as related data in a form of a block with its intensity value, and that intensity image and multi-resolution images be discarded after use.

The second embodiment is similar to the first one described above in that following the intensity image production, image feature points extraction unit 39 is used to extract image feature points, however the image feature points data is not discarded after computing the motion data, the image feature points selected by image feature points selection unit 40 and their absolute motion data are stored in image feature point set data 59. This allows image feature points data collection to store not only the image feature points of the immediately previous frame, but also for those frames further in the past. Many different criteria can be used to select which image feature point set data to store and discard, such as storing only those with greater than specified predetermined number of feature points, or storing those with greater than specified predetermined amount of positional displacement, or storing all feature point set data. Another useful technique is to discard image feature points that are older than a specified predetermined age.

After performing step S1 described above in the first embodiment, motion data calculation unit 36 skips step S2 because there are no registered intensity images. Then in step S3, image feature point set data 59 is referenced in order to search for image feature points that match the image feature points of the intensity image of the target image. When searching for matching image feature points, the initial value used for the search is the absolute motion data computed using the relative motion data from the previous (lower) resolution. This absolute motion data is compared against the absolute motion data of the image feature points, and if the image feature points are found within the target image, the difference in the absolute motion data value is used as the initial value of the search.

Obtain the motion data of the target image feature points and their surrounding blocks by performing step S3 and step S4 stated above.

Figure 5A:
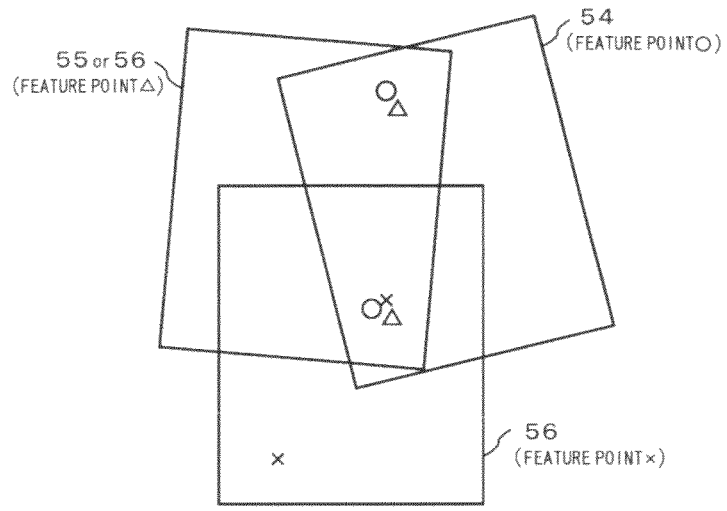
FIG. 5A is a concept diagram of an image feature points matching of multiple snapshots.
Figure 5B:
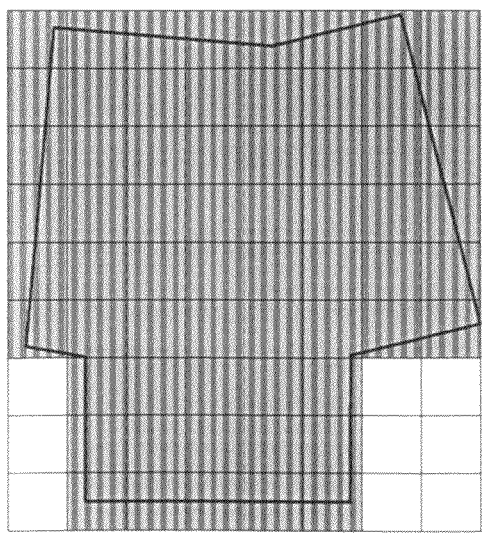
FIG. 5B is a concept diagram of a producing process of a panoramic canvas based on the image feature points matching.

Then, the motion data of the feature points and their surrounding blocks of the high resolution images are computed by using the image feature points of the intensity image (circles, triangles, and exes in the diagram) shown in FIG. 5A. The stitching process as in FIG. 5B by using this motion data to correct for distortions produces the panoramic canvas consisting of specific sized mosaic panel (shaded area in the diagram).

According to this second embodiment, a high quality panoramic image can be produced because the image feature points of the intensity images determine the motion of captured images for creating the panoramic image. This is reinforced by changing the alpha-blending ratio according to the feature amount of image feature points of the intensity image, which reduces mismatching effects during stitching.

Matching the image feature points of the target image with image feature point set data enables accurate stitching because it allows image feature points of past intensity images to be used in the computation.

This invention can be implemented on computing devices such as personal computers, as well as on other devices such as digital cameras and camera phones.

What is claimed is:

1. A panoramic image producing apparatus comprising:
a processing device to control an overall operation for producing a panoramic image based on an input image;
an imaging device operatively connected to the processing device to acquire photographic images and to provide an acquired image to the processing device;
a display device operatively connected to the processing device to display images including the panoramic image;
a memory device operatively connected to the processing device and the imaging device to store data used for producing the panoramic image;
the processing device is configured to conduct the following operations of: producing an intensity image of an input image captured by the imaging device;
causing the memory device to store a reference image which is used as a reference when motion of the intensity image is calculated and absolute motion data of the reference image which represents motion of the reference image from a reference position;
registering the intensity image of the target image and its motion data when a displacement value between a previously registered intensity image and the target image exceeds a certain predetermined value;
performing a motion data calculation process for setting an intensity image of a newly input image as a target image, calculating relative motion data with multi-degrees of freedom of the target image with respect to the reference image according to a block matching process, and calculating the absolute motion data with multi-degrees of freedom of the target image from the reference position using the absolute motion data of the reference image and the relative motion data of the target image;
producing a panoramic image that extends in 2- dimensional directions by performing a stitching process that stitches each input image corrected for distortion using its absolute motion data; and
setting the target image as the new reference image based on a specific condition;
performing a filtering process to produce image data of various resolutions; and
in the motion data calculation process, calculating the relative motion data of the target image by performing a whole-image matching process that determines a parallel movement between the reference image and the target image of the lowest resolution, and calculating the relative motion data with multi-degrees of freedom of the target image with respect to the reference image by performing the block matching process to higher resolution intensity image using the motion data of the previous level of resolution as the initial value;
wherein the processing device extracts one or more intensity images out of intensity images that are registered depending on an amount of overlap with the target image in a perpendicular direction against a motion direction of the target image, and calculates the relative motion data of the target image using the reference image and the intensity images extracted.

2. The panoramic image producing apparatus of claim 1, wherein the processing device further conducts the following operations of:
detecting feature points in the intensity images;
causing the memory device to store, as feature point data, a feature amount and positional data of the detected feature points; and
calculating the relative motion data of the target image based on the feature point data of the target image and the stored feature point data of the intensity images.

3. The panoramic image producing apparatus of any one of claims 1 and 2,
wherein the processing device divides input images to be stitched into blocks or pixels, and changes a blending ratio depending on a block or pixel location inside the input image and/or the absolute motion data thereof.

4. The panoramic image producing apparatus according to claim 1,
wherein the processing device, when receiving a new input image, stitches the input image to an existing panoramic image, and discards the input image after the stitching process.

5. The panoramic image producing apparatus according to claim 1, wherein the motion data with multi-degrees of freedom are motion vectors or affine parameters.

6. A non-transitory computer readable medium containing a program for producing a panoramic image from input images captured by an imaging device, the program comprising the following steps:

(a) creating intensity images of the input images;

(b) producing an intensity image of an input image captured by an imaging device;

(c) storing a reference image which is used as a reference when motion of the intensity image is calculated and absolute motion data of the reference image which represents motion of the reference image from a reference position;

(d) setting an intensity image of a new input image as a target image, calculating relative motion data with multi-degrees of freedom of the target image with respect to the reference image according to a block matching process, and calculating the absolute motion data with multi-degrees of freedom of the target image from the reference position using the absolute motion data of the reference image and the relative motion data of the target image;

(e) producing a panoramic image that extends in 2-dimensional directions by stitching each input image corrected for distortion using its absolute motion data calculated by step (d);

(f) setting the target image as a new reference image based on a specific condition;

(g) performing a filtering process to produce image data of various resolutions; and (h) in the motion data calculation process, calculating the relative motion data of the target image by performing a whole-image matching process that determines a parallel movement between the reference image and the target image of the lowest resolution, and calculating the relative motion data with multi-degrees of freedom of the target image with respect to the reference image by performing the block matching process to higher resolution intensity image using the motion data of the previous level of resolution as the initial value.

* * * * *